United States Patent [19]

Moser et al.

[11] 4,432,493
[45] Feb. 21, 1984

[54] SYSTEM FOR HEATING THE SERVICE CABIN OF A MACHINE

[75] Inventors: Gottfried Moser, Bergisch Gladbach; Hansjurgen Gross, Niederkassel, both of Fed. Rep. of Germany

[73] Assignee: Klöckner-Humboldt-Deutz AG, Cologne, Fed. Rep. of Germany

[21] Appl. No.: 297,254

[22] Filed: Aug. 28, 1981

[30] Foreign Application Priority Data

Sep. 6, 1980 [DE] Fed. Rep. of Germany ....... 3033661

[51] Int. Cl.$^3$ ............................................... B60H 1/02
[52] U.S. Cl. ................................. 237/12.3 R; 122/26; 126/247; 237/12.3 A
[58] Field of Search ................... 122/26; 126/247; 237/1 R, 12.3 B, 12.3 R; 165/41, 42

[56] References Cited

U.S. PATENT DOCUMENTS 3,333,771 8/1967 Graham ............................... 122/26
4,114,809 9/1978 Sampson ............................. 126/247
4,192,456 3/1980 Shields et al. ................. 237/12.3 R

FOREIGN PATENT DOCUMENTS 2628697 1/1977 Fed. Rep. of Germany .
2949834 11/1979 Fed. Rep. of Germany.. 237/12.3 R
2315666 1/1977 France ................................. 122/26

Primary Examiner—Albert J. Makay
Assistant Examiner—Henry Bennett
Attorney, Agent, or Firm—Watson, Cole, Grindle & Watson

[57] ABSTRACT

This invention relates to a system of heating the service or operator's cabin of a machine, such as a mobil crane, or the like, or a motor vehicle equipped with an internal combustion engine comprising a hydraulic pump, a heat exchanger located in the service cabin or in the hot-air supply line thereof, a heat generator connected between the pump and the heat exchanger in the oil circuit of the internal combustion engine having suction and return oil lines respectively extending from the pump and from the heat exchanger to an oil sump of the engine, an oil line by-passing the heat generator and being controlled by a directional control valve, and an oil line by-passing the heat exchanger and being controlled by a control mechanism.

8 Claims, 1 Drawing Figure

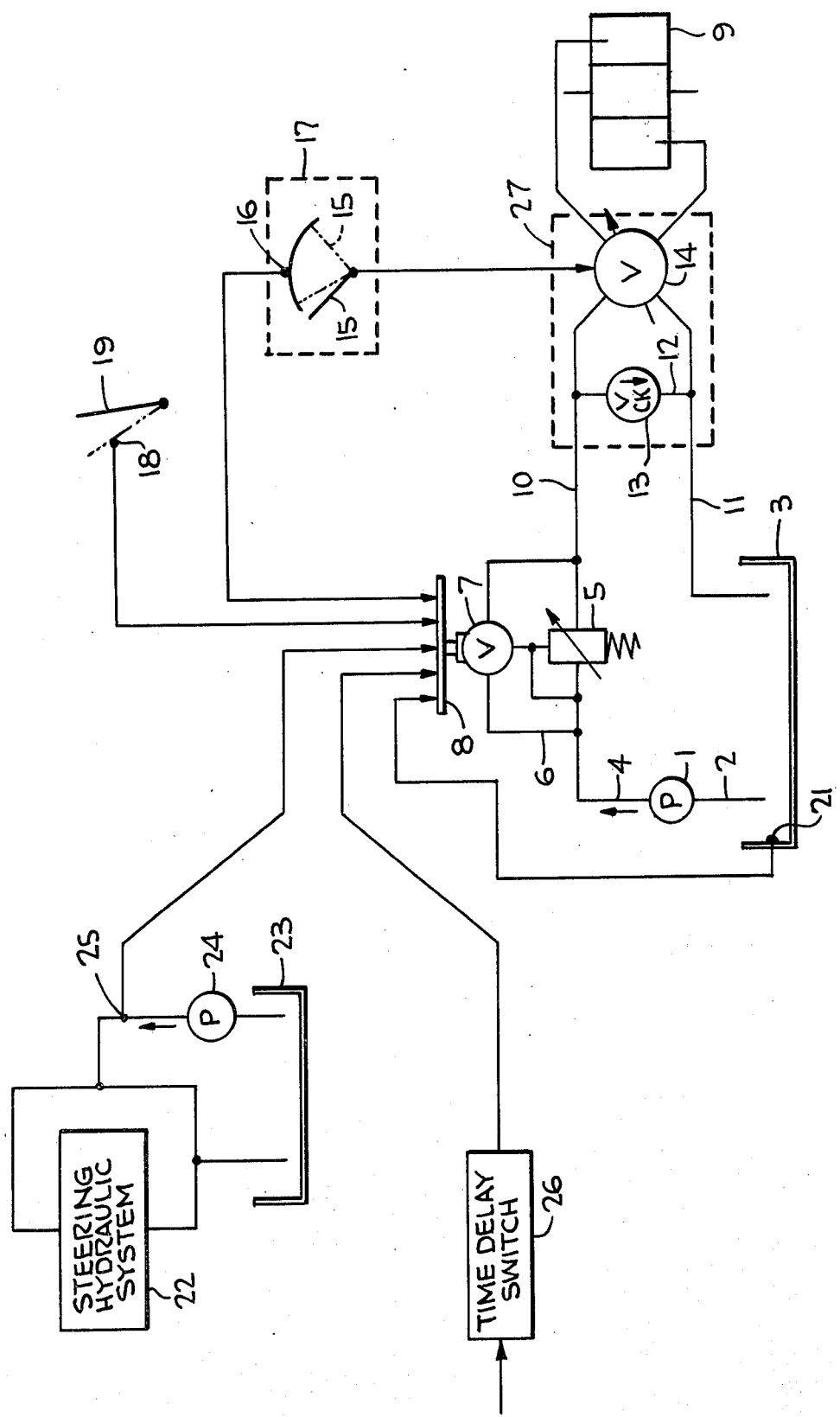

SYSTEM FOR HEATING THE SERVICE CABIN OF A MACHINE

RELATED APPLICATIONS

This application relates to U.S. Ser. Nos. 123,169 (now U.S. Pat. No. 4,352,455), 123,944 (now U.S. Pat. No. 4,346,839), 165,083 (now U.S. Pat. No. 4,370,956) and 249,936, respectively filed Feb. 20, 1980, Feb. 25, 1980, July 1, 1980 and Apr. 1, 1981.

BACKGROUND OF THE INVENTION

This invention relates to a system of heating the service or operator's cabin of a machine, such as a mobil crane, or the like, or a motor vehicle equipped with an internal combustion engine comprising a hydraulic pump, a heat exchanger located in the service cabin or in the hot-air supply line thereof, a heat generator connected between the pump and the heat exchanger in the oil circuit of the internal combustion engine haing suction and return oil lines respectively extending from the pump and from the heat exchanger to an oil sump of the engine, an oil line by-passing the heat generator and being controlled by a directional control valve, and an oil line by-passing the heat exchanger and being controlled by a control mechanism.

In German Application No. P 29 49 834.8, a related system of the aforementioned type is disclosed in which the heat generator comprises a variable throttle or nozzle, the temperature being regulated by means of a control mechanism in the oil delivery pipe behind the high-pressure lift pump, and by-pass lines for the pressure-relief (nozzle) and heat-transfer devices are controlled, inter alia, by thermostatic means, so that only one by-pass or pressurization is provided for these two devices. Such an arrangement, however, achieves no optimum results either from a standpoint of adjustability of from a utilization of the heat supplied by the internal combustion engine. The gradual shutoff of a partial flow, for the purpose of regulating the temperature development, functions to control at the same time the mass flow and the pressure level upstream of the pressure-relief element. Such control is over-sensitive and reacts to each variation in the quantity of oil delivered with a change in the heat reduction. As a pressure-relief element, the nozzle provided is extremely unsuitable for such an arrangement in which the lift pump supplies a volume flow which varies greatly with engine speed. A large nozzle orifice size permits no temperature development when the flow rate is small, while a small nozzle orifice size does not allow the throughput delivered by the pump at high speeds and leads to heavy losses in the pump. While the temperature control is generally effected by the control mechanism or behind the high-pressure lift pump and, thus, directly affects the temperature development, the shutdown of the heater with a simultaneous heating of the heating medium can only be effect upstream of the heat exchanger. This requires two control mechanisms for controlling the heating device which inevitably leads to two control elements and, because of the large number of combination positions, results in a complex control system with mutual interference between the control mechanisms.

SUMMARY OF THE INVENTION

It is therefore an object of the present invention to provide a system of the general class aforedescribed for heating the service cabin of a machine powered by an internal combustion engine, which system includes a working element suitable for generating heat in the heat medium over the entire speed range of the engine while the same time relieving the pressure in the heating medium, rendering the operating facility precisely sensitive to temperature variations, and permitting the engine to be loaded only within prescribed limits. Also, other options are provided for designing the power input of the heater in such a manner that no power losses are noticeable in the internal combustion engine.

In the heating system according to the invention, the working element is in the form of a pressure relief valve which is mechanically fixed at a constant opening pressure and which can be input-controlled. The control mechanism in the bypass of the heat exchanger comprises an adjustable flow control valve for regulating oil flow and being adjustable by a manual control lever combined with an actuating switch. The by-pass line to the working element has a directional control valve which includes a control element capable of being activated by the actuating switch for opening the directional control valve, and a thermostatic switch responsive to the temperature of the heating medium for activating the control element, independent of the manual control/actuating switch, for opening the directional control valve above a predetermined temperature required for operation of the engine. The waste engine heat may thus be effectively utilized for heating the service cabin.

The control element of the directional control valve can also be actuated for opening the by-pass line to the working element by the provision of an engine speed-sensitive time-delay switch, set to start from average speeds, and being coupled with increasing time periods for the opening of the directional control valve. The heat requirements may thus be met over a desired speed range while energy can be saved in operation of the internal combustion engine. Such time-delay switch is overridingly connected with respect to the actuating switch and with respect to the thermostatic switch.

The engine powered machine may include equipment having a primary steering hydraulic system which includes a pressure switch for also activating the control element and being over-ridingly connected with respect to the actuating switch and with respect to the thermostatic switch for opening the line by-passing the working element. Such pressure switch is set for opening the directional control valve upon reaching a predetermined high operating pressure in the hydraulic system.

A switch activated by the accelerator pedal of the vehicle may be provided for also actuating the control element, such switch being overridingly connected with respect to the actuating switch and with respect to the thermostatic switch for opening the directional control valve, such opening being effected upon a fully depressed position of the pedal.

The control lever provided for the adjustable flow control valve which regulates the oil flow in the by-pass line provided for the heat exchanger, may form a constructional unit with the actuating switch provided for activating the control element of the directional control valve.

The present system may further include another line by-passing the heat exchanger and containing a relief valve for the protection of the heat exchanger. Such relief valve and the adjustable flow control valve may together form a constructional unit.

The internal combustion engine for the present system may comprise an air-cooled internal combustion engine having a thermostatically controlled fan drive.

Other objects, advantages and novel features of the invention will become more apparent from the following detailed description of the invention when taken in conjunction with the accompanying drawing.

DETAILED DESCRIPTION OF THE INVENTION

Turning now to the single drawing FIGURE which schematically illustrates a system according to the invention for heating the service cabin of a machine powered by an internal combustion engine (not shown), a hydraulic pump 1 in the oil conduit of the internal combustion engine has a suction line 2 extending from an oil sump 3 of the engine, the pump delivering oil as a heating medium through line 4 at its high pressure side and through a pressure relief valve 5 which functions as a heat generator for the oil and which may be input-controlled. A line 6, by-passing valve 5, contains a directional control valve 7 which includes a control element 8. Valve 7 and its control element 8 may together comprise an electro-magnetic valve, with element 8 being an adjustable magnet. Otherwise, element 8 may comprise a servomotor or an electrically controlled pneumatic or hydraulic cylinder for the control of a suitable valve 7.

A heat exchanger 9 is located in the oil circuit between a supply line 10 and a return line 11 leading to oil sump 3. The heat exchanger may be located in the service cabin or in a hotair supply line thereof, and may be of an oil or air type.

An oil line 12 by-passes the heat exchanger and contains a pressure relief valve 13 for the protection of the heat exchanger. In another line by-passing the heat exchanger is an adjustable flow control valve 14 for regulating oil flow through the oil circuit and thus controlling the heating medium passing through the heat exchanger. This valve 14 can be adjusted by a manual control lever 15 with which an actuating switch 16 may be combined as a constructional unit 17. This actuating switch 16 is operatively connected with control element 8 in any normal manner for manually activating the same for opening the directional control valve responsive to the need for reducing or cutting off the heat required for the service cabin.

Control element 8 may be further activated by a switch 18 operatively connected therewith and being activated by an accelerator pedal 19 of the motor vehicle. Switch 18 is arranged for activating the control element for opening the directional control valve upon a fully depressed position of pedal 19.

A thermostatic switch 21, responsive to the temperature of the engine oil and shown exposed to the oil in the sump 3, is operatively connected with control element 8 for activating same for opening directional control valve 7 above a predetermined temperature required for operation of the engine. This thermostatic switch is therefore set for opening valve 7 above such predetermined temperature. Switch 18 is overridingly connected with respect to actuating switch 16 and with respect to thermostatic switch 21.

The machine powered by the internal combustion engine may include equipment having a primary steering hydraulic system 22 with a separate oil flow circuit including an oil sump 23 and a hydraulic pump 24. A pressure switch 25 at the pressure side of pump 24 is operatively connected with control element 8 for activating same for opening the directional control valve in by-pass line 6. This pressure switch 25 is overridingly connected with respect to actuating switch 16 and with respect to thermostatic switch 21 for opening by-pass lines 6. The pressure switch is set for opening the directional control valve upon reaching a predetermined high operating pressure in the hydraulic system.

Further, an engine speed-sensitive time-delay switch 26 is provided for also activating control element 8, this switch 26 being overridingly connected with respect to actuating switch 16 and with respect to thermostatic switch 21 for opening by-pass line 6. Increasing engine speeds are coupled with increasing clock periods for opening the directional control valve.

And, it should be pointed out that relief valve 13 and flow control valve 14 may together form a constructional unit 27.

In accordance with the present system, working element 5 effects, independently of the mass flow through the oil circuit, a constant raising of the temperature of the heating medium, with the delivery pressure of the hydraulic pump remaining substantially constant. In such manner, the most important condition for the adjustability of service cabin heating is met, because the heat transmission depends chiefly on the temperature difference. The quantity delivered by the hydraulic pump should be designed in such a manner that the heat exchanger can be supplied with all the heat it requires even at the lowest engine speed. Adjustability of the heater is effected according to the invention because a by-pass to the heat exchanger is controlled by an adjustable flow control valve which can be varied by a manual control lever, thus permitting a continuous reduction of heat provided for the heater. When no power for heating is required and the total mass flow in valve 14 is gradually shut off, the heating medium is still heated in the desired manner to a certain extent. In such case, the by-pass to the working element remains closed until the heating medium has attained the temperature which is adequate for optimum performance of the engine. When the engine has reached this temperature, which is measured by thermostatic switch 21 in the heating medium or on a component of the internal combustion engine, the by-pass to the working element opens and only the heat being developed in the internal combustion engine is utilized to meet the heat requirements of the heat exchanger. Through this temperature-sensitive control, actuating switch 16 for the heating operation is overridden; in other words, the thermostatic switch operates independently of the position of actuating switch 16. While, in accordance with the invention, the thermostatic switch prevents more heat to be withdrawn from the internal combustion engine than is needed for heating purposes, the actuating switch insures that the internal combustion engine does not lose any power. This is desirable when, owing to the ambient temperature, no heating is required, or when the full power output of the engine is required for other operational purposes. Also, thermostatic switch 21, or another such switch, is set for activating the control element for closing the directional control valve below the predetermined temperature of the engine operation. Thus, the operating temperature of the engine is automatically reduced to a minimum, independently of the power supply of the internal combustion engine and of the heating requirements of the heat exchanger. The actuating switch and the heat control lever may be combined into a single constructional unit so that after the flow of heating medium to the heat exchanger has been reduced, by-pass to the working element may be opened by a further lever movement.

As mentioned hereinabove the hydraulic pump is so designed that even at idle speeds a sufficient quantity of oil is supplied to the heat exchanger. When the operating temperature reaches an adequate level, the by-pass to the working element is opened, so that no further power is lost. However, until this temperature is attained, a larger flow of heating medium is delivered at substantially higher speeds than is necessary for the rating of the heat exchanger. Thus, more energy is withdrawn from the internal combustion engine than is necessary. To prevent this, the by-pass for valve 5 is opened by a speed-sensitive time-delay switch, for example, starting from average speeds coupled with increasing clock periods for opening the directional control valve. In such manner, the heat requirements of the heat exchanger can be appropriately met even over this speed range, while energy can be saved in terms of the internal combustion engine.

As described above, by means of actuating switch 16 the power input can be exposed to the hydraulic pump when a large power supply of the internal combustion engine is required. However, when this control cannot be carried out because a heating operation is absolutely necessary and when, furthermore, these peak power requirements are only required periodically, for example, for accelerating the vehicle, or by means of switch 18 acting as a kick-down mounted on the accelerator pedal, by-pass 6 can be opened for a limited time. In such manner, even with the heater switched on, the internal combustion engine can at any time supply its peak power for powering purposes.

If the internal combustion engine powers, for example, a primary hydraulic system, the same effect can also be obtained by the provision of a pressure switch 25 located, for example, on the pressure side of its hydraulic pump for releasing the peak power by shutting down the heater.

Since the system according to the invention may also utilize an air-cooled internal combustion engine, and since every attempt should be made to conserve energy and, at the same time, a maximum proportion of the waste heat being developed in the internal combustion engine should be made available for heating purposes, such an engine should be provided with a thermostatically controlled fan drive which is not activated until the engine has reached its operating temperature and the heat requirements of the heater are fully met.

Obviously, many other modifications and variations of the present invention are made possible in the light of the above teachings. It is therefore to be understood within the scope of the appended claims the invention may be practiced otherwise than as specifically described.

What is claimed is:

1. A system for heating the service cabin of a machine powered by an internal combustion engine having an oil sump containing lubricating oil, and a lubricating oil distribution circuit, the system comprising a hydraulic pump, a heat exchanger located in the service cabin or in a hot-air supply line thereof, heat generating means connected between said pump and said heat exchanger in said oil circuit of the internal combustion engine, said circuit having suction and return oil lines respectively extending from said pump and said heat exchanger to said oil sump of the engine, a first line in said circuit by-passing said means and being controlled by a directional control valve, and a second line in said circuit by-passing said heat exchanger and being controlled by a control mechanism, the improvement wherein said heat generating means comprises a pressure relief valve which is mechanically fixed to effect a constant opening pressure, said control mechanism comprises an adjustable flow control valve for regulating oil flow, means for manually adjusting said control valve for regulating said heat exchanger, said directional control valve having a control element, said manually adjusting means including a first actuating switch for activating said control element for opening said directional control valve, and means responsive to the temperature of the oil for activating said control element, independent of said manually adjusting means, for opening said directional control valve above a predetermined lubricating oil temperature required for operation of said engine to make available to said heat exchanger the waste heat of said oil upon regulation of said heat exchanger, said temperature responsive means being set for opening said directional control valve above said predetermined temperature, and said temperature responsive means being set for activating said control element for closing said directional control valve below said predetermined temperature required for engine operation so that the lubricating oil in said distribution circuit may be heated by said fixed pressure relief valve as required for the operation of said engine irrespective of whether heat is required for said heat exchanger.

2. The system according to claim 1, wherein an engine speed-sensitive time-delay which is provided for also activating said control element, said time-delay switch being overridingly connected with respect to said first switch and with respect to said temperature responsive means for opening said first by-pass line, increasing engine speeds being coupled with increasing clock periods for opening said first by-pass line.

3. The system according to claim 1, wherein the machine includes equipment having a primary steering hydraulic system including a pressure switch for also activating said control element and being overridingly connected with respect to said first switch and with respect to said temperature responsive means for opening said first by-pass line, said pressure switch being set for opening said first by-pass line upon reaching a predetermined high operating pressure in said hydraulic system.

4. The system according to claim 1, wherein a second switch activated by an accelerator pedal of the machine is provided for also actuating said control element, said second switch being overridingly connected with respect to said first switch and with respect to said temperature responsive means for opening said first by-pass line, the opening of said first by-pass line being effected upon a fully depressed position of said pedal.

5. The system according to claim 1, wherein said first switch and said lever control form of a constructional unit.

6. The system according to claim 1, wherein a third line is provided in said circuit by-passing said heat exchanger and having a relief valve therein for the protection of said heat exchanger.

7. The system according to claim 6, wherein said relief valve in said third line and said adjustable flow control valve form a constructional unit.

8. The system according to claim 1, wherein said engine comprises an air-cooled internal combustion engine having a thermostatically controlled fan drive.

* * * * *